(12) United States Patent
Smith

(10) Patent No.: US 6,580,914 B1
(45) Date of Patent: Jun. 17, 2003

(54) METHOD AND APPARATUS FOR AUTOMATICALLY PROVIDING LOCATION-BASED INFORMATION CONTENT ON A WIRELESS DEVICE

(75) Inventor: Adrian David Smith, Kirkland, WA (US)

(73) Assignee: AT&T Wireless Services, Inc., Redmond, WA (US)

(*) Notice: Subject to any disclaimer, the term of this patent is extended or adjusted under 35 U.S.C. 154(b) by 0 days.

(21) Appl. No.: 09/135,348

(22) Filed: Aug. 17, 1998

(51) Int. Cl.[7] ................................................. H04Q 7/20
(52) U.S. Cl. ...................... 455/456; 455/436; 455/422; 455/437
(58) Field of Search ................................. 455/437, 436, 455/456, 457, 422, 435, 433; 340/825.49

(56) References Cited

U.S. PATENT DOCUMENTS

| | | | | |
|---|---|---|---|---|
| 4,608,711 A | * | 8/1986 | Goldman ..................... 455/456 |
| 5,361,399 A | * | 11/1994 | Linquist et al. ............. 455/54.1 |
| 5,392,331 A | * | 2/1995 | Patsiokas et al. .............. 379/63 |
| 5,697,064 A | * | 12/1997 | Okamoto et al. ........... 455/33.1 |
| 5,797,097 A | * | 8/1998 | Roach, Jr. et al. ........... 455/466 |
| 5,822,696 A | * | 10/1998 | Bergkvist ..................... 455/436 |
| 5,842,131 A | * | 11/1998 | Yamane ....................... 455/456 |
| 5,963,861 A | * | 10/1999 | Hanson ....................... 455/422 |
| 5,963,866 A | * | 10/1999 | Palamara et al. ........... 455/456 |
| 5,999,813 A | * | 12/1999 | Lu et al. ...................... 379/435 |
| 6,026,304 A | * | 2/2000 | Hilsenrath et al. .......... 455/456 |
| 6,047,194 A | * | 4/2000 | Andersson ................... 455/466 |
| 6,049,711 A | * | 4/2000 | Ben-Yehezkel et al. ..... 455/414 |
| 6,078,818 A | * | 6/2000 | Kingdon et al. ............. 455/456 |
| 6,138,008 A | * | 10/2000 | Dunn et al. ................. 455/414 |

* cited by examiner

Primary Examiner—Edward F. Urban
Assistant Examiner—Marceau Milord
(74) Attorney, Agent, or Firm—Kenyon & Kenyon

(57) ABSTRACT

A method and apparatus provide location based filtering for searching for information in response to a request from a mobile handset. The handset detects location information from the mobile network with which the handset is in communication and forwards the location information as part of an information request to an information database. The location information is used as a filter for selecting a response to the information request.

24 Claims, 3 Drawing Sheets

FIG. 2

| NEWS 1 | SID 1 |
|---|---|
| NEWS 2 | SID 1 |
| NEWS 3 | SID 2 |
| NEWS 4 | SID 3 |
| ⋮ | ⋮ |

FIG. 3

| WEATHER 1 | REGION A |
|---|---|
| WEATHER 2 | REGION B |
| WEATHER 3 | REGION C |
| ⋮ | ⋮ |

FIG. 4

| TRAFFIC 1 | SID1 BS1 |
|---|---|
| TRAFFIC 2 | SID1 BS3 |
| TRAFFIC 3 | SID2 BS1 |
| ⋮ | ⋮ |

| DIRECTIONS TO A | MAHO A |
|---|---|
| DIRECTIONS TO A | MAHO B |
| DIRECTIONS TO A | MAHO C |
| ⋮ | ⋮ |

METHOD AND APPARATUS FOR AUTOMATICALLY PROVIDING LOCATION-BASED INFORMATION CONTENT ON A WIRELESS DEVICE

BACKGROUND OF THE INVENTION

The present invention relates to a method and apparatus for providing information to a communications device. More particularly, the invention relates to providing information to a mobile wireless device where the information is location sensitive.

In today's environment there are a multitude of communication options for people interested in obtaining and exchanging information. In addition to the standard telephone communication services available, commonly referred to as plain old telephone service (POTS), such services as mobile wireless communications and various computer communication network configurations allow subscribers to either exchange information among themselves or to retrieve information from certain information sources.

In accordance with some modifications to communication systems, there is the ability to provide a user or subscriber with location-dependent information. Dealer locator services provide such information. In a dealer locator service, a telephone subscriber on a wire line network can call a designated telephone number. Using the number dialed as well as the phone number of the calling party, a service provider can send to the caller information about one or more dealers of a product or service, dealer selection being based on a location relationship to the calling party. In fact, in some circumstances the caller can also be routed to the located dealer. Such a service is made possible because the calling party number in the wireline configurations relates to a particular telephone line that typically terminates at a fixed geographic location. Thus, the calling party number is associated with a rather stationary geographic location which makes it easy to associate a caller with a particular location when it is planned to make call processing decisions that are caller location related. One of the primary benefits of a mobile wireless service is the ease with which a subscriber can move through different locations and maintain a communication connection to the network. In this circumstance, the user or wireless device is not associated with a generally fixed geographic location. This lack of certainty makes it difficult to provide location—dependent services to mobile wireless subscribers.

As mobile wireless technology has evolved, system have been modified so as to provide mobile handsets which can receive text messages in addition to voice communications. This latter service is referred to as the Short Messaging Service (SMS) which is described in the IS-136 protocol for mobile wireless communications. SMS can be utilized with a handset which includes a browser capability so as to allow the user to search for information from a plurality of different databases in much the same way a browser such as Netscape allows a user of a personal computer to search for information, for example on the WorldWide Web.

It would be advantageous if information retrieval using the wireless device could take into account the location of that device. This would assist the subscriber in retrieving germane information in an expeditious manner.

SUMMARY OF THE INVENTION

The present invention provides location based information services to a mobile wireless device. In accordance with an embodiment of the present invention, when a user of a mobile handset searches for information from an information database, the handset forwards, along with the request, information concerning the location of the handset. The information transmitted by the handset is derived from the wireless network. For instance, the location information could be constituted by a system identifier associated with a mobile switching center with which the mobile is in contact. It could be a cell number associated with the cell with which the mobile handset is in contact or it could be more precise location information derived from signal strength detection based on certain neighbor cell site frequencies determined from, for instance, information provided for mobile assisted-hand-off. Thus, depending on the desired level of granularity, the mobile handset provides a particular level of location information to the information database that the user is interested in searching. The location information constitutes a filter for selecting location appropriate information for transmission to the mobile handset in response to the information request.

BRIEF DESCRIPTION OF THE DRAWINGS

FIGS. 2 to 5 illustrate example database entries which might be employed in an implementation of the present invention.

FIG. 6 illustrates a flow chart for describing a processing operation in accordance with an embodiment of the present invention.

DETAILED DESCRIPTION

In accordance with an embodiment of the present invention, a wireless mobile device collects location information from the wireless system with which it communicates. The location information can be of various types. Each type defines a different level of granularity with regard to location. After gathering this location information, the wireless device can present that information along with any request that it makes for information from an information database. As an example, the device could be designed to obtain information from a database that normally returns the requested information in the form of short messages consistent with the Short Messaging Service defined in the IS-136 protocol. A database can select information that is germane to the subscriber's request using the caller location information presented with the request.

Figure 1:
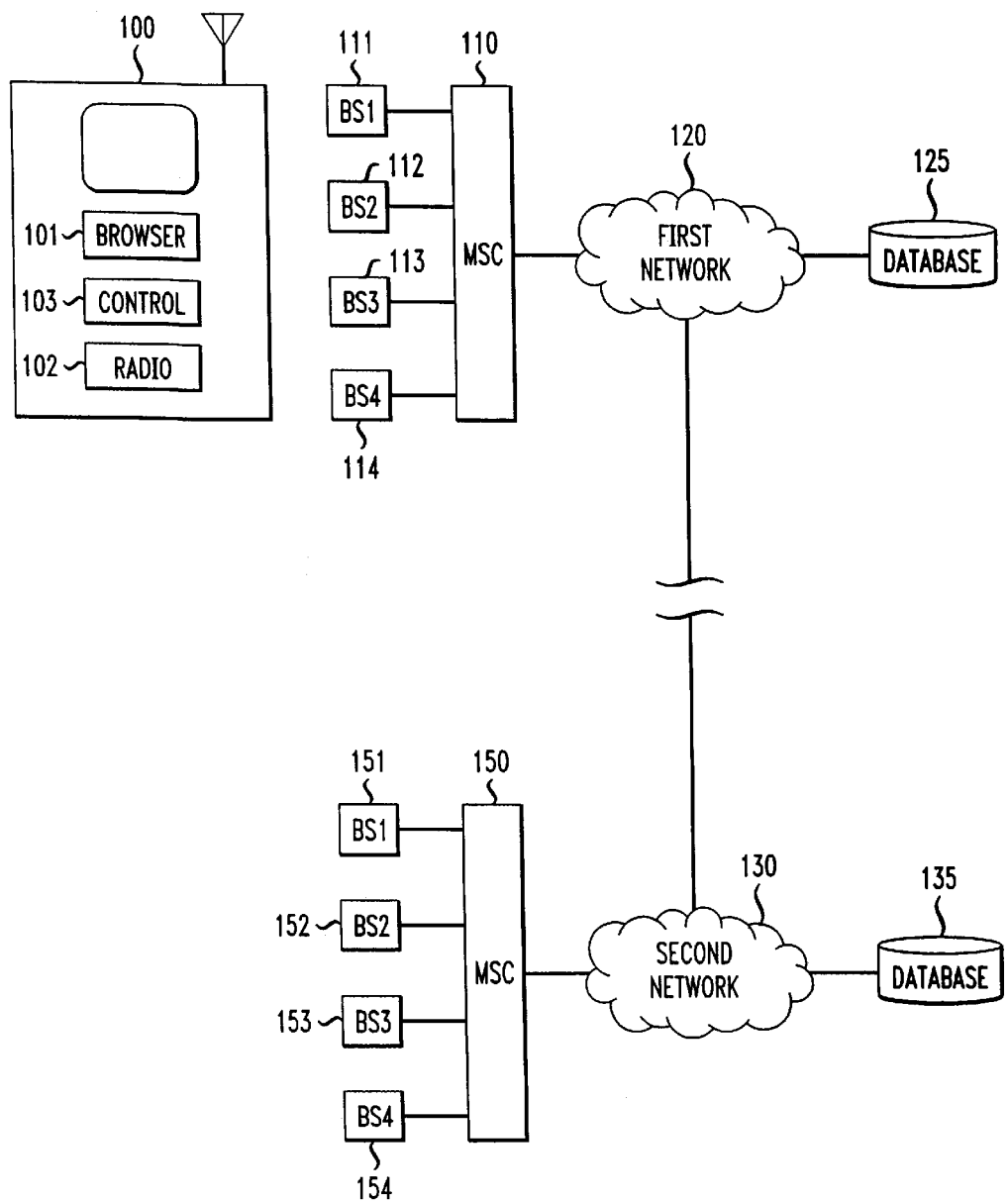
FIG. 1 illustrates, in block diagram form, one potential network configuration in which the present invention might be employed.

FIG. 1 illustrates an example of a system in which the present invention can be employed. In this system a subscriber may operate a wireless device 100 which may be a wireless telephone. The device will typically have processor capabilities as well as software for executing operations with the processor. The device software can include a browser 101. The browser can operate in a manner similar to browsers such as Netscape which provide a user with the capability to search for information from various resource servers in a network. The mobile device communicates via wireless links accessible with the radio capabilities 102 of the device. All the operations can be guided by a control processor 103.

The mobile device may be used throughout various locations within the subscriber's wireless network. Such a network can include one or more mobile switching centers (MSCs), for example 110. A plurality of radio base stations 111 to 114, for example BS1 to BS4, are coupled to the mobile switching center and provide the radio interface between mobile devices and the mobile switching center 110. In addition to being able to move within the coverage area of the network to which the user subscribes, typically the user is provided with roaming capabilities which allow the user to activate the mobile device in a network coverage area for a network to which he or she does not subscribe. For example, rather than being in communication with any of base stations 111 to 114, the user could take the mobile device into a region which is serviced by MSC 150 having associated base stations 151 to 154. This MSC 150 could be part of a second wireless network that has a roaming agreement with the first wireless network. The agreement allows the user to receive and originate calls within the second wireless network even though they are not a subscriber to that network.

The browser capabilities of the wireless device allow the device to request information via a radio transmission to an associated base station (BS) and MSC combination whereby the information request may be forwarded by a transmission network, for example first network 120 or second network 130, or by a plurality of such networks, to a resource server 125 or 135 having a database of resources and information. In accordance with an embodiment of the present invention, the hand held device collects location information from the wireless network with which it is in communication and forwards that location information to the resource server along with any request for information or a resource. The server uses the location information as a filter to select appropriate information that is responsive to the request generated by the hand held device. An example of a geographic location information source from the wireless network is a system ID (SID) that is associated with the MSC with which the mobile wireless device is presently communicating. For instance, MSC 110 has an associated SID that is representative of a geographic region serviced by MSC 110. If more specific location information is desired, then cell site information might be derived from identification signals included in the radio transmissions of the base station with which the mobile is in communication. Thus, each of the base stations, for example 111 to 114, have some identifier associated therewith which identifies the basic cell with which the base station is associated. Therefore, that information presents a more precise indication of the location of the mobile device. Even further refinements as to location information are possible. For instance, in implementing a technique by which the mobile may be operating while moving from cell to cell or from one transmitter footprint to another, the mobile will utilize mobile assisted hand-off information (MAHO). This MAHO information includes an identification of carrier frequencies available from adjacent cells or subcells all of which are serviced by the same base station. The mobile device, as part of its hand off procedures, detects the relative strength of the signals identified in the neighboring cell carrier list. This information can be translated into geographic location information as described in co-pending application Ser. No. 08/868,402 entitled "A Method for Locating A Mobile Station" and assigned to the assignee of the present application. The technique for determining position information from this signal strength information is hereby incorporated by reference.

Thus, there are a number of different levels of geographic location information which may be detected from the wireless network by the wireless device. All or some of this geographic location information could be presented to the resource server for example 125, as part of a request for specific types of information.

Examples of database content which might be utilized in connection with the present invention are set forth in FIGS. 2 to 5. As an example, the user of the cellular device may desire information such as news pertaining to a particular geographic area. FIG. 2 illustrates a database which correlates news items and system identifiers. Thus, as illustrated in FIG. 2 news items 1 and 2 may be germane to users presently communicating from a geographic location corresponding to system ID 1 while news item 3 is more germane to a subscriber in the geographic location corresponding to system ID 2. Thus, when a subscriber initiates a request for information from, for example, database 125 seeking news items, the request will include geographic location information such as the SID. The server will use the location information as a filter. If the user is in the geographic location corresponding to SID 1, the server would return news items 1 and 2.

Similarly, a coarser grain of location information may be warranted depending on the type of information. For example, where a database may include information with regard to weather, that information may be applicable to multiple SIDs which together are deemed to constitute a given region. Thus, FIG. 3 illustrates a circumstance where weather information 1 is germane to region A, weather information 2 is germane to region B, and weather information 3 is germane to region C. Each of these regions may be constituted by one or more SIDs. Upon receipt of the request for the weather information as well as an appropriate SID, the database can select the weather information that is best suited for the subscriber's location.

Figures 5, 6:
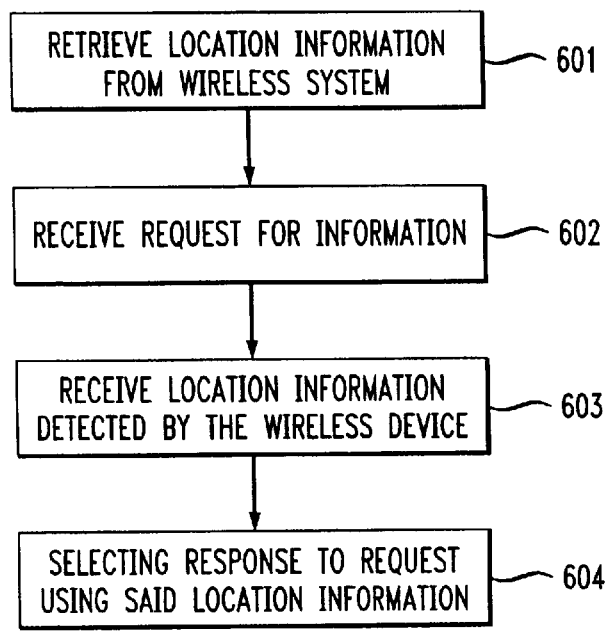

FIGS. 4 and 5 provide examples of databases which provide information based on a finer level of granularity than that described with-respect to FIGS. 2 and 3. More particularly, FIG. 4 illustrates an example of correlating information to the geographic location covered by a particular base station. In this example, the type of information referred to is traffic information. Other types of information also might be more germane to this level of geographic location definition. In a manner analogous to that described above with regard to FIGS. 2 and 3, the database suggested by FIG. 4 correlates traffic information to geographic location information that here includes SID and base station information. Thus traffic item 1 is more germane to SID 1/base station 1 while traffic item 2 is more germane to SID 1/base station 3. Traffic item 3 is more germane to SID 2/base station 1. Upon receipt of the information request and the geographic location information transmitted by the mobile device, the database. an select the appropriate traffic information for transmission to the mobile device.

FIG. 5 illustrates that detailed information relevant to an even finer level of location information, e.g., information that might be used to provide directions to a particular location, can be gleaned using the MAHO information described above. In the examples shown in FIG. 5, there are three different sets of direction instructions to the same point A, each different instruction set relevant to a different MAHO list that the wireless device may employ.

All through the discussions above, specific examples of types of information have been presented, e.g., news items, weather items, traffic items, directions. The present invention is not directed to nor limited by these specific types of information which may be desired by the user of the mobile device. Instead, the present invention is applicable in all cases where information might be more relevant to a given user when the mobile device is in one location as opposed to another location. Thus, it is possible for the present invention to be employed in a dealer locator environment where the calling party desires to be connected to a nearby dealer of a product or service. In this latter type of process, it would be possible to either provide the user with the location and phone number information for the closest dealer or alternatively the system could select a nearby dealer and automatically connect to that dealer without intervention by the user. In this latter situation, the database would be translating a called number into another telephone number for establishing a connection based, at least in part, on the location information provided by the mobile device.

FIG. 6 provides an overview of a method for implementing an embodiment of the present invention. As indicated above with respect to FIG. 1, the mobile device can retrieve location information from the wireless system, step 601. That server can then receive a request for information generated by the wireless device, step 602. Either at the same time or in response to a specific request back to the mobile for the location information, the server will receive location information detected by the mobile earlier in the operation, step 603. In, response to the request and the location information, the server can then select the response, step 604. The server can then operate on the response either by forwarding the response to the requester or, as described above, by translating the call to another number and establishing a connection to that other number.

Thus, in accordance with the present invention, the user is able to retrieve information whose relevance will vary depending on the location associated with the mobile device at the time that the request is made. The location information automatically detected from the wireless network by the mobile device is used as a filter for selecting information in a particular database that is most germane to the requesting user because it pertains to a geographic area at or near which the user of the wireless device is presently located.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for providing information to a wireless device, the method comprising:
   receiving a request for a first category of information;
   determining a level of granularity of the first category of information;
   determining location information based on the level of granularity of the first category of information requested such that the location information has a level of granularity that corresponds to the level of granularity of the first category of information;
   searching a database for data associated with the first category of information; and
   transmitting information found in the search to the wireless device.

2. The method of claim 1 wherein the location information includes a system identifier which identifies a wireless system with which the wireless device is registered.

3. The method of claim 1 wherein the location information includes a cell identifier which identifies a wireless cell with which the wireless device is in communication.

4. The method of claim 1 wherein the location information includes mobile-assisted-hand off frequency information.

5. A method of claim 1, wherein the request for a first category of information is received from the wireless device.

6. A method of claim 1, wherein the location information is received from the wireless device.

7. A method for selecting information for transmission to a wireless device, the method comprising:
   determining a level of granularity of a category of information;
   determining location information based on the level of granularity of the category of information such that the location information is tailored to the level of granularity of the first category of information;
   searching a database for data associated with the category of information;
   identifying a subset of data from the data associated with the category of information.

8. The method of claim 7 wherein the location information includes a system identifier which identifies a wireless system with which the wireless device is registered.

9. The method of claim 8 wherein searching the database further comprises selecting a category of information using a number called by the wireless device.

10. The method of claim 7 wherein the location in formation includes a cell identifier which identifies a wireless cell with which the wireless device is in communication.

11. The method of claim 7 wherein the location information includes mobile-assisted-hand-off frequency information.

12. The method of claim 7 wherein searching the database further comprises selecting data associated with the category of information using a number called by the wireless device.

13. A method of claim 7, wherein the location information is received from the wireless device.

14. A method for providing selected data to a wireless communication device, the method comprising:
   receiving a request for data residing at a data site;
   determining a level of granularity of the data requested;
   determining location information based on the level of granularity of the data requested such that the location information is tailored to the level of granularity of the data requested;
   selecting data from the data site using the location information; and
   transmitting the selected data to the wireless communication device.

15. The method of claim 14, wherein transmitting the selected data further comprises sending a text message for display on the wireless communication device.

16. The method of claim 15 wherein the wireless communication device is a wireless telephone device.

17. The method of claim 14 wherein the wireless communication device is a wireless telephone device.

18. The method of claim 14, wherein receiving a request for data occurs during a telephone call.

19. A method of claim 14, wherein the request for data is received from the wireless communications device.

20. A method of claim 14, wherein the location information is automatically detected by the wireless communication device from the wireless communication system.

21. A method for providing selected data to a wireless communication device, the method comprising:
   receiving first location information associated with a message type, said first location information having been received by said wireless communication device from a wireless system in which said wireless communication device is registered at a first time;
   selecting data associated with the message type to be conveyed to said wireless communication device, using the first location information;

transmitting the selected data associated with the first location information to the wireless communication device;

receiving second location information associated with the message type, said second location information having been received by said wireless communication device from a wireless system in which said wireless communication device is registered at a second time;

selecting data associated with the message type, to be conveyed to said wireless communication device, using said second location information; and transmitting the selected data associated with the second location information to the wireless communication device.

22. A method for delivering geographically relevant information to a wireless device comprising:

receiving a request for location sensitive information;

determining a level of granularity of the location sensitive information;

determining a location of the wireless device based on the level of granularity of the location sensitive information such that the location has a level of granularity that corresponds to the level of granularity of the location sensitive information;

retrieving geographically relevant information from a database based on the location of the wireless device; and transmitting the geographically relevant information to the wireless device.

23. The method of claim 22 wherein the step of determining a location of the wireless device further comprises the step of determining the location to an appropriate resolution based on the nature of the information requested.

24. A method of claim 22, wherein the request for location sensitive information is received from the wireless device.

* * * * *

UNITED STATES PATENT AND TRADEMARK OFFICE
CERTIFICATE OF CORRECTION

PATENT NO.    : 6,580,914 B1
DATED         : June 17, 2003
INVENTOR(S)   : Adrian David Smith It is certified that error appears in the above-identified patent and that said Letters Patent is hereby corrected as shown below:

Column 4,
Line 48, change "database. an" to -- database can --.

Column 6,
Line 10, delete "first".
Line 20-21, change "location in formaton" to -- location information --.

Signed and Sealed this

Thirtieth Day of December, 2003

JAMES E. ROGAN
*Director of the United States Patent and Trademark Office*